Patented Oct. 23, 1951

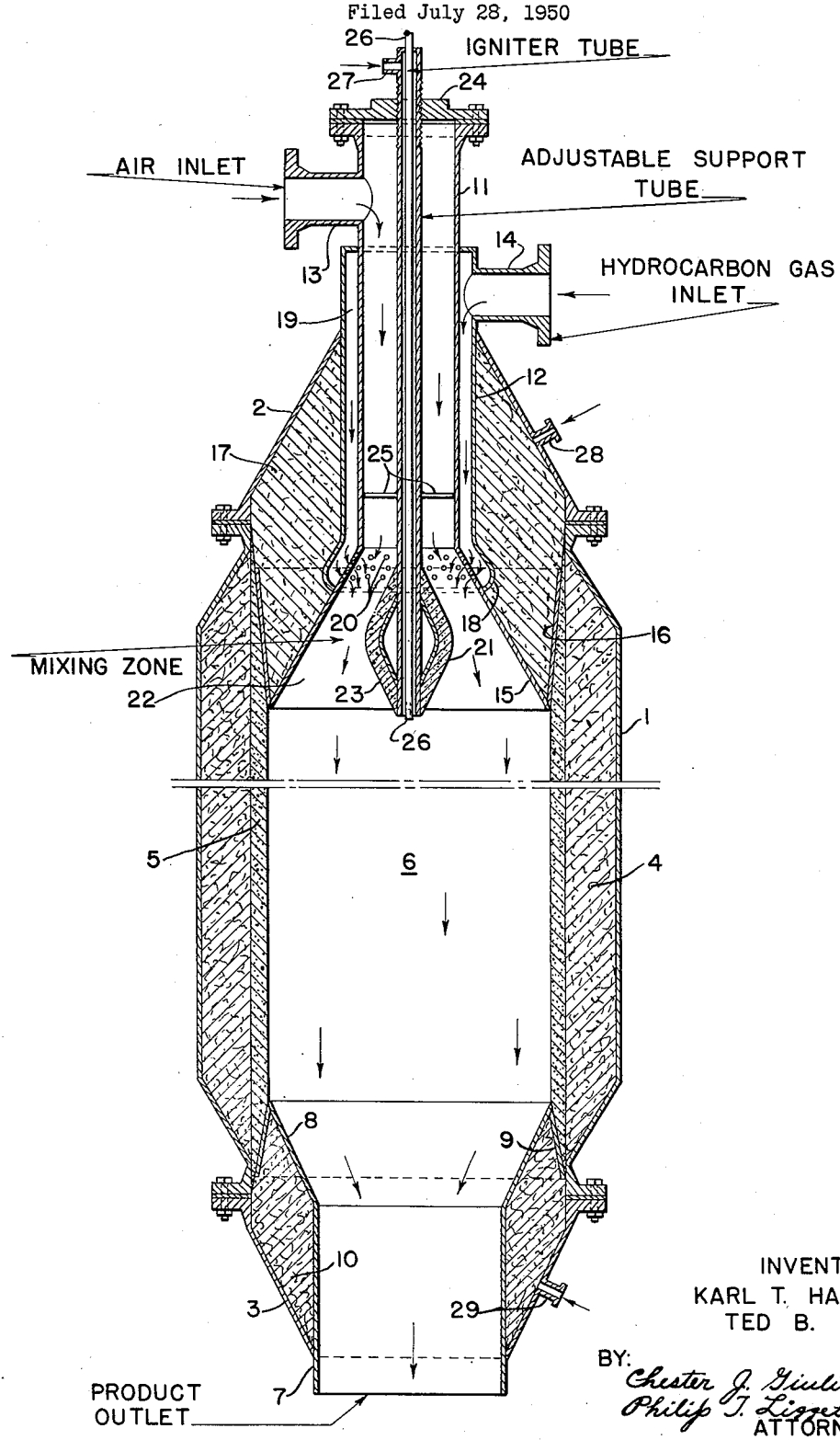

2,572,338

UNITED STATES PATENT OFFICE 2,572,338

AUTOTHERMIC CRACKING REACTOR

Karl T. Hartwig, Glen Ellyn, and Ted B. Haufe, Western Springs, Ill., assignors to Universal Oil Products Company, Chicago, Ill., a corporation of Delaware Application July 28, 1950, Serial No. 176,338

5 Claims. (Cl. 23—284)

This invention relates to an improved type of reactor suitable for effecting the mixing and high temperature conversion of gaseous reactant streams. The apparatus is particularly adapted for use in effecting the autothermic or oxidative cracking of a gaseous hydrocarbon stream in admixture with a controlled oxygen or air stream.

The autothermic cracking of a hydrocarbon stream, such as ethane, propane, butane, and the like, may be carried out in the presence of an oxidizing stream of air or oxygen, having a controlled oxygen content, to provide an exothermic reaction by the burning of at least a portion of the hydrocarbon stream to in turn produce heat for an endothermic cracking of the remaining portion of a hydrocarbon stream, and thus produce more valuable products. For example, propane in admixture with air may be cracked to make a supplementary gas to meet peak load demands for gas companies or the like; while for petroleum-chemical manufacturing companies, it may be desirable to effect the cracking of ethane, or other available volatile hydrocarbons, to in turn produce a high yield of ethylene which may be used as a starting material for the manufacture of alcohol, anti-freeze mixtures, or various plastic products. There are of course many types of reactors and conversion chambers which are in use or have been used in connection with the mixing and cracking of gaseous hydrocarbon streams, however, many of these reactors are constructed such that they are not readily assembled or disassembled for maintenance purposes. Also, most types of reactors do not have any means for adjusting the volume of the mixing zone in order to obtain optimum mixing and conversion conditions.

It is a principal object of the present invention to provide a lined reactor chamber which is adapted to effect the rapid intimate mixing of reactant streams in order to carry out efficiently a resulting high temperature conversion.

It is also a principal object of the present invention to provide a construction which permits the adjustment of the volume of the mixing zone, so that maximum conversion conditions for the reactant streams may be effected. In addition the improved design provides assembly features which permit ready accessability to the interior of the chamber for maintenance purposes.

Briefly, the improved reactor of this invention comprises in combination, an elongated pressure tight chamber having internal refractory lining, a reactant stream inlet conduit extending into and discharging axially into the end of said chamber, a second reactant stream inlet conduit spaced concentrically around the first mentioned conduit and thus passing an annular shaped gaseous stream into the inlet end of the chamber through perforations within a portion of a flared or frusto-conical section extending from the end of the first mentioned inlet conduit to the interior refractory wall of the lined chamber, a double-ended cone shaped deflector or baffle is spaced away from and held concentrically within the frusto-conical section opposite the perforations therein, the baffle thereby forming a restricted annular shaped mixing zone that increases in volume toward the reaction section of the chamber, and product outlet means in the end of said reactor chamber opposite the inlet end.

In a preferred embodiment of the improved reactor, the double-ended cone shaped deflector, forming the annular shaped mixing zone of the unit, is supported on an open-ended tubular conduit which extends concentrically within the first mentioned inner reactant stream inlet conduit. The open-ended tube terminates at the interior end of the double-ended cone shaped baffle and provides means for introducing a flame or igniting gas into the end of the reactor at the end of the mixing zone. Also in accordance with this particular feature of the present invention, the support tube is made adjustable with respect to the end of the reactor chamber such that the cone shaped baffle which is positioned thereon may be moved inwardly or outwardly with respect to the frusto-conical section, to in turn provide a variable volume mixing zone. An igniter tube is positioned within the supporting tube, and provides means for igniting a gas stream in starting up the unit for oxidative or autothermic cracking purposes. Where the improved reactor is used for the autothermic cracking of a hydrocarbon stream, to produce, for example, ethylene, the oxygen containing or air stream is preferably introduced through the inner inlet conduit and the hydrocarbon stream passed through the outer conduit, as the annular-shaped stream being introduced through the orifices or perforations in the flared section. Thus, the hydrocarbon stream is introduced into the air stream as a plurality of jet-like streams. The size and spacing of the perforations or orifices are such that the mass velocity ratios of the hydrocarbon to air in the mixing zone is preferably in the range of 1.5 to 5.0, whereby optimum mixing may be obtained. Also, the volume of the mixing zone is preferably held to below a maximum of about 5% of the total volume of the reactor chamber. The volume of the flared annular-shaped mixing zone is of course variable, by adjusting or moving the tube which in turn supports the deflector member within the frusto-conical section.

Additional features and advantages in the construction of the improved cracking reactor will be apparent upon reference to the accompanying drawing and the following description thereof.

Referring now to the drawing, there is indicated one embodiment of the improved reactor apparatus, comprising an elongated body section 1, with a removable inlet head 2 and a removable outlet head 3. The body section 1 and the removable heads each have suitable flanges, so that the heads may be removably attached to the elongated body section in a pressure tight manner. The entire reactor chamber is also lined with a suitable refractory type of insulation. In this instance, a thick insulating material 4 is shown adjacent the wall 1, while a harder surface insulating and refractory material 5 is shown as an interior lining to form the internal cracking or conversion zone 6. The outlet head 3 has a metallic liner 7, preferably of alloy material which extends inside the chamber to provide a flared section 8 which meets and contacts the interior lining 5. A bent section or collar section 9 provides a metallic portion suitable to bear against the end of the refractory liner 5 and at the same time hold a block insulating type of material 10 within the interior or enclosed portion of head 3. This construction is of advantage in providing a readily removable type of head, which in turn permits the insulation 10 to be held and maintained with the head 3.

The upper head 2 has a concentric inner conduit 11 and a concentric exterior conduit 12 extending therethrough in a manner forming gas passageways for introducing gaseous reactant streams to the interior of the reactor chamber. The inner conduit 11 has a gas inlet nozzle 13, which in this instance is indicated as an air inlet, while the exterior conduit 12 has an inlet nozzle 14, indicated as a hydrocarbon gas inlet. At the inside end of the inner inlet conduit 11, there is a flared or frusto-conical section 15 which extends from the end thereof inwardly and outwardly to contact the interior liner wall 5 of the central body section. The end of the flared section 16 has a bent portion, or collar section 16, which in turn is adapted to bear against the end of the refractory insulation 5, while retaining a soft insulating material 17 within the removable head portion. In other words, the inlet head section 2, with the gas inlet conduits, nozzles, flared section, etc., together with the insulating material 17, is attached to, or removed from connection with, the elongated body section 1 as a substantially separate unit.

The interior end of the exterior conduit 12 terminates in a closure portion 18, which in turn butts against the flared section 15, whereby an annular shaped gas passageway 19, extending between the conduits 11 and 12, is terminated and gas blowing therefrom passes into the interior of the chamber by way of a plurality of orifices or perforations 20. The orifices 20 are spaced entirely around the throat portion of the conical shaped or flared section 15 so that the gaseous reactant stream is distributed uniformly into the gas stream which in turn flows through the interior of the conduit 11 into a mixing zone and thence into the reaction section. Also, in accordance with a preferred embodiment of this invention, a conically shaped baffle or deflector 21 is positioned axially or concentrically within the frusto-conical or flared inlet section 15 whereby to form a restricted mixing zone 22, which in turn is a cone shaped annulus increasing in volume as it widens in diameter. The deflector 21 is a double-ended cone-shaped member so that the mixing zone widens very rapidly beyond the point of maximum diameter of the deflector 21, flaring to the inside diameter of the elongated chamber body portion 1. The deflector 21 is of circular cross section, with the diverging inlet end thereof and the flared section 16 forming the mixing zone annulus 22. The cone shaped inlet end of deflector 21 also has a slope equal to that of the slope of the frusto-conical section 15, in order to provide a uniform divergent annulus for the mixing zone 22.

The deflector 21 may be of an alloy steel construction suitable to withstand high temperature conditions or alternatively may be steel covered with a ceramic refractory type of material such as indicated in the present drawing. The double ended cone shaped reflector or baffle 21 is adjustably positioned within the interior of the unit by a supporting rod or tube 23, which in turn can be propelled or retracted within the interior of the unit, with respect to the flared section 15. In this embodiment, the supporting tube 23 is indicated as being threaded and passing through a suitable threaded portion of a cover plate 24, which in turn may be bolted to or otherwise removably attached to the end of the interior inlet conduit 11. It is, however, not intended to limit the method of adjusting the supporting rod 23 and the baffle or deflector 21 by means of the threaded attachment, for obviously a packing gland or other adjustable means may be used for this purpose.

In addition to the particular feature and advantage of having the deflector member 21 adjustable with respect to the flared cone 15 so that the mixing zone may be changed in volume to provide optimum conversion conditions, it is a construction feature of the present embodiment to have the largest diameter of the deflector or baffle member 21 smaller than the inside diameter of the interior conduit 11, such that by removing the cover plate 24 the supporting tube, the deflector 21, and the internal portions thereof may all be readily removed from the interior of the chamber. Suitable ribs or spacing members 25 are placed exteriorly around the supporting tube 23 so that the latter may be held concentrically or axially within the conduit 11 and the flared section 15.

Still another feature of a desired embodiment of the apparatus, is the concentric positioning of an ignitor tube 26 within the supporting tube 23, so that where the reactor is used as an oxidative or autothermic cracking reactor, the initial burning and start up of the oxidative reaction may readily be accomplished. For starting up purposes, a combustible gaseous stream may be introduced into the supporting rod 23 by means of a gas inlet 27. Thus, the combustible gas passes downwardly around the ignitor tube 26 passing outwardly into the interior of the reactor around the open end of the ignitor tube 26. Both the supporting and ignitor tubes terminate at the end of deflector 21. Suitable means may be provided for passing puffs of flame through the ignitor tube 26 and lighting the gas being introduced through inlet nozzle 27 and the interior of the supporting tube 23. In an oxidative type of cracking reaction, after the combustion of the hydrocarbon stream is commenced and the reactor chamber is brought to temperature, the igniting flame may of course be turned off. In other words the ignitor tube and gas supply through the interior of the supporting tube 23 is utilized for starting up purposes only.

The present reactor may be used to advantage in effecting the conversion of various types of gaseous or vaporous reactant streams, however, it is particularly adapted to carrying out an autothermic cracking reaction as hereinbefore mentioned, so that more desirable products may be obtained from a saturated hydrocarbon stream such as ethane, propane, butane, or the like. In an autothermic conversion operation, the air or oxygen-containing stream is preferably introduced through the interior of the internal conduit 11 and the hydrocarbon gas stream is introduced through nozzle 14 and the annular passageway 19 so that it mixes with the oxygen-containing stream as a plurality of jet-like streams coming into the air stream at substantially right angles thereto and against the opposing baffle or deflector member 21. Thus, there is considerable turbulence and rapid intimate mixing of the two gaseous streams within the restricted mixing zone 22. The number of orifices and their size may of course be varied to provide different velocities from the orifices and various mixing ratios in the mixing zone. In the high temperature cracking of a normally gaseous hydrocarbon stream to provide ethylene, orifices are provided to pass the hydrocarbon stream into admixture with the air so that the mass velocity ratio of hydrocarbon to air within the mixing zone is within the range of from 1.5 to 5.0. Also, the mixing zone is adjusted so that the volume of the conically shaped annulus between the outer face of the deflector member 21 and the interior face of the conically shaped flared or flared section 15, provides a small mixing zone of less than 5% of the total reactor volume.

It may also be noted, that while the deflector member 21 is substantially circular in cross-section, in order to maintain a uniform spacing away from the face of the flared section 15, it may have some variations in shape to in turn aid in providing better mixing between the gaseous reactant streams. In other words, the outer end need not be of a smooth conical or ellipsoidal shape, for alternatively, the entire surface of the deflector member 21 may have certain irregularities or ribs or the like to provide increased turbulence in the deflection of the reactant streams which impinge against it.

The reactor embodiment indicated in the drawing provides a downward flow of the reactant streams and the resulting product streams through the reactor, however, it may be pointed out that the reactor may be well utilized in other positions and is not limited to the vertical positioning and a downward flow of reactant streams. In addition, a suitable packing material such as refractory metal or ceramic balls, or the like, may well be used within the interior of the elongated chamber to further aid in the intimate mixing of the reactant streams as they pass through the reactor. For example, in an autothermic cracking reaction the hot combustion gases from burning of a portion of the hydrocarbon stream must be intimately mixed with the remaining portion of the hydrocarbon stream in order that it may be cracked to desired products.

Flanges have been shown as a means for connecting the various sections of the entire reactor, however, here again it is not intended to limit the construction to that type of removable attachment, for other clamping or connecting means may well be used. It is a specific feature of the improved apparatus however, to have the reactor constructed into the self-contained portions as illustrated and described, such that either or both of the ends of the reactor may readily be removed for repair or inspection purposes, and readily reassembled without damaging the insulation within the interior of the chamber. Still another construction feature utilizes small gas inlet nozzles 28 and 29 in the upper and lower heads 2 and 3, respectively, such that an inert gaseous stream, such as steam or the like, may be introduced into the interior of each head section and in turn prevent the passage of the reactant streams or product streams from entering the crack or crevice at the juncture between the interior collar sections of the heads and the inner surface of the refractory liner 5 of the body section 1.

We claim as our invention:

1. An improved reactor for mixing and effecting high temperature reactions between gaseous reactant streams, which comprises in combination, an elongated pressure tight chamber having internal refractory lining, a reactant stream inlet conduit extending into and discharging axially into one end of said chamber, a second reactant stream inlet conduit spaced concentrically around first said inlet conduit and discharging an annular shaped stream into the end of said chamber, a flared frusto-conical section extending from first said inlet conduit to the inner wall of said chamber, a plurality of orifices spaced around the smaller diameter inlet portion of said flared section, a cone-shaped deflector concentric within and spaced from said flared section and opposing said orifices therein, said deflector forming a restricted mixing annulus that increases in volume toward the interior of said reaction chamber, and product outlet means through the end of said chamber opposite said inlet end.

2. The apparatus of claim 1 further characterized in that an adjustable supporting tube for said deflector extends longitudinally and axially through first said inlet conduit and through said cone-shaped deflector, said supporting tube movable longitudinally within said chamber and providing thereby a variable volume mixing annulus.

3. An improved reactor for effecting mixing and high temperature reacting of gaseous streams, which comprises in combination, a reactor chamber having an internally insulated elongated body section, an internally insulated inlet end section, and an internally insulated outlet end section, with the internal insulation and lining means tapered for each of said sections whereby said end sections may have insulation extend into the ends of said body section and lap over a portion of the lining in the ends thereof, a gas inlet conduit concentric within said inlet end section having the interior end thereof flaring outwardly in a frusto-conical section extending to the inner wall of said elongated body section of said chamber, a second gas inlet conduit concentric around first said gas inlet conduit forming an annular gas passageway, the interior end of last said conduit terminating and contacting against the exterior face of said frusto-conical section extending from first said interior conduit, a plurality of gas orifices spaced around the small diameter throat section of said frusto-conical section and communicating with said annular gas passageway, whereby gas therefrom may be jetted through a plurality of orifices at substantially right angles into the gas stream passing through said interior conduit into said frusto-conical section, a conically shaped deflector member spaced from and concentrically within said conical section opposite said plurality of orifices therein and forming a conically shaped annulus suitable for a gas mixing zone, said deflector member supported and positioned within said frusto-conically shaped section by a long open-ended supporting tube extending axially through first said gas inlet conduit, said supporting tube movably connected and supported at the exterior end of first said gas inlet conduit whereby it may be moved in and out of said conduit and thereby adjust the spacing of said deflector member with respect to said conically flared section, with said conically shaped annulus between said deflector member and said frusto-conical section providing a variable volume mixing zone, and product outlet means through the end of said outlet end section of said chamber.

4. The reactor of claim 3 further characterized in that said axial supporting tube for said deflector member has an ignitor tube extending axially therethrough and spaced therefrom with an interior open-ended ignitor tube terminating at the inner open end of said supporting tube and at the end of said deflector member, and gas inlet means connects with the exterior end of said movable supporting tube whereby an igniting fuel may be passed through the annular space between said ignitor tube and the interior of said supporting tube.

5. The reactor of claim 3 further characterized in that said orifices spaced around the smaller diameter portion of said flared section and passing gas from said annular passageway into said mixing zone provide area sufficient to effect a mass velocity ratio of gas passing therethrough with respect to gas passing through said interior gas inlet conduit of the order of 1.5 to 5.0, and said deflector member is adjusted with respect to said flared conical section providing a mixing zone annulus having a volume of less than 5% of the total interior reactor volume.

KARL T. HARTWIG.
TED B. HAUFE.

No references cited.